(12) United States Patent
Kurozuka

(10) Patent No.: US 8,395,633 B2
(45) Date of Patent: Mar. 12, 2013

(54) SCANNING TYPE IMAGE DISPLAY APPARATUS

(75) Inventor: Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/338,467

(22) Filed: Dec. 28, 2011

(65) Prior Publication Data

US 2012/0169752 A1    Jul. 5, 2012

Related U.S. Application Data

(63) Continuation of application No. PCT/JP2011/002448, filed on Apr. 26, 2011.

(30) Foreign Application Priority Data

Apr. 28, 2010 (JP) ................................. 2010-103286
Apr. 28, 2010 (JP) ................................. 2010-103287

(51) Int. Cl.
*G09G 5/36* (2006.01)
*G06K 9/60* (2006.01)

(52) U.S. Cl. ....................................... 345/545; 382/305
(58) Field of Classification Search ......................... None
See application file for complete search history.

(56) References Cited

U.S. PATENT DOCUMENTS

| 6,351,261 | B1* | 2/2002 | Reichlen et al. ............... 345/427 |
| 7,580,007 | B2 | 8/2009 | Brown et al. |
| 7,916,372 | B2 | 3/2011 | Nishizawa |
| 2003/0016844 | A1* | 1/2003 | Numaoka ...................... 382/100 |
| 2004/0004585 | A1 | 1/2004 | Brown et al. |
| 2009/0213040 | A1 | 8/2009 | Brown et al. |
| 2009/0251756 | A1 | 10/2009 | Nishizawa |
| 2010/0060551 | A1* | 3/2010 | Sugiyama et al. ................. 345/8 |
| 2011/0025983 | A1* | 2/2011 | Sprague et al. ................. 353/20 |

FOREIGN PATENT DOCUMENTS

| JP | 2005-526289 | 9/2005 |
| JP | 2006-135825 | 5/2006 |
| JP | 2007-93644 | 4/2007 |
| JP | 2009-244799 | 10/2009 |
| JP | 2009-265625 | 11/2009 |
| WO | 2009/041055 | 4/2009 |

OTHER PUBLICATIONS

International Search Report issued May 24, 2011 in International (PCT) Application No. PCT/JP2011/002448.

\* cited by examiner

*Primary Examiner* — Kee M Tung
*Assistant Examiner* — Frank Chen
(74) *Attorney, Agent, or Firm* — Wenderoth, Lind & Ponack, L.L.P.

(57) ABSTRACT

A scanning type image display apparatus including a light source, a frame buffer, a scanning mirror, a drive controller which outputs a drive signal to the scanning mirror, and a display controller which reads out pixel data from the frame buffer, generates display data for modulating an intensity of a laser beam using the readout pixel data, and causes the light source to emit an intensity-modulated laser beam based on the display data. The display controller calculates a scanning position of the laser beam on the display screen by the scanning mirror based on information relating to the drive signal inputted from the drive controller, reads out pixel data corresponding to the calculated scanning position on the display screen by executing a burst access to the frame buffer, and implements interpolation to generate the display data corresponding to the scanning position of the laser beam on the display screen.

9 Claims, 9 Drawing Sheets

SCANNING TYPE IMAGE DISPLAY APPARATUS

This application is a Continuation of International Application No. PCT/JP2011/002448 with the International Filing Date of Apr. 26, 2011.

TECHNICAL FIELD

The present invention relates to a scanning type image display apparatus for displaying an image by scanning a laser beam using a scanning mirror, such as a laser projector, an HMD (Head Mount Display), and an HUD (Head Up Display). The apparatus includes the following. A frame buffer has a two-dimensional logical address space configured corresponding to a display screen, and stores a plurality of pixel data in address positions corresponding to respective positions on the display screen in the order in which the plurality of pixel data is inputted. A direction corresponding to the order in which the pixel data is stored in the two-dimensional logical address space is defined as an address direction. A drive controller drives a scanning mirror in such a manner that a laser beam is scanned in a direction nonparallel to a direction corresponding to the address direction on the display screen. A display controller calculates a scanning position of the laser beam on the display screen, reads out a plurality of pixel data including pixel data at an address position in the two-dimensional logical address space corresponding to the calculated scanning position or a position near the scanning position by executing a burst access to the frame buffer in the address direction, and implements interpolation using the plurality of pixel data for generating display data corresponding to the scanning position of the laser beam on the display screen. The scanning mirror is a resonant mirror, and driving frequencies in the first direction and in the second direction are respectively set near resonant frequencies of the scanning mirror in the first direction and in the second direction. The drive controller outputs, to the scanning mirror, the drive signal configured such that the driving frequency is discretely set with an interval of a predetermined step size. The drive controller switches, in a case where the resonant frequency of the scanning mirror in one of the first direction and the second direction varies, the driving frequency to a driving frequency at a succeeding step, before the varied resonant frequency reaches the discretely set driving frequency at the succeeding step, and switches, in response to the switching of the driving frequency, the driving frequency of the scanning mirror in the other of the first direction and the second direction while maintaining a predetermined relationship.

BACKGROUND ART

Development of an image display apparatus for displaying an image by scanning a laser beam has been expected in view of the advantage that the image display apparatus is capable of displaying an image with a simplified arrangement in a wide color reproduction range and with a high contrast. In particular, the image display apparatus is suitable for e.g. a mobile projector or an HMD in which miniaturization is required.

For instance, various systems including a system incorporated with a pixel type display device such as a liquid crystal element or an organic EL as an image display portion, and a system of directly rendering an image in the retinas of the user's eyes by two-dimensionally scanning a laser beam have been proposed in an image display apparatus such as an HMD (Head Mount Display), which is configured to be mounted on the head of the user for displaying an image.

In such an image display apparatus, it is necessary to make the entirety of the display apparatus compact and lightweight in order to reduce the load on the user at the time of wearing, and to allow the user to wear the apparatus for a long time. Further, if the image display apparatus is configured substantially with the same design as the generally used eyeglasses, the user is allowed to wear the image display apparatus on a steady basis like the usual eyeglasses.

However, in the system incorporated with the pixel type display device, as a higher quality and a wider viewing angle are required, a display portion, a prism for guiding light emitted from the display portion to the eyes, and an eyepiece optical system incorporated with a half mirror increase in size. This makes it difficult to make the image display apparatus compact and lightweight.

Further, the large-sized eyepiece optical system as described above is configured to cover the space in front of the eyes, and has a shape similar to the shape of a goggle or a helmet, rather than the shape of eyeglasses. Thus, the user finds it difficult to feel as if he or she wears eyeglasses, and it is difficult to implement a general eyeglass type image display apparatus.

On the other hand, a retinal scanning type image display apparatus employing a laser scanning system is advantageous in miniaturizing the image display apparatus because of the use of a compact MEMS (Micro-Electro-Mechanical-System) mirror device.

It is suitable to use a resonant mirror capable of generating a large displacement with a small driving force in an image display apparatus which is required to be miniaturized such as the aforementioned eyeglass type HMD. Further, it is optimal to use a two-axis resonant MEMS mirror capable of scanning along two axes with a one-chip device.

Usually, in the case where a laser beam is scanned by a scanning mirror, it is desirable to scan at a high speed in a horizontal direction, and at a speed suitable for the frame rate of displaying a moving image in a vertical direction, e.g., at 60 Hz. However, designing a scanning mirror to resonate at such a low frequency as described above may lower the rigidity of a spring structure for supporting the mirror, and may weaken the mirror against external disturbance such as vibrations.

In view of the above, there is proposed a method for resonantly driving a scanning mirror along two axes at a higher frequency, in other words, a method for displaying an image by Lissajous scanning.

For instance, patent literature 1 discloses a relationship between a frequency and a phase in displaying an image by Lissajous scanning, using a two-axis resonant scan system.

Patent literature 1 further discloses the following. Usually, since a sinusoidal wave scan pattern does not intersect the position of a source pixel derived from a source image, the position of a scanning pixel does not coincide with the position of the source pixel. Accordingly, the quality of a scan image is improved by interpolating the intensity of a scanning pixel by an image generator based on the intensity of a source pixel.

The conventional arrangement has the following problems to be solved.

It is necessary to access pixel data of plural source pixels and to read out the pixel data from a buffer memory storing the pixel data of source pixels in order to interpolate pixel data of a source image with respect to the position of a certain scanning pixel for determining the pixel value of the scanning pixel.

Usually, a DRAM (a Dynamic RAM) is used as a source image buffer memory for an image display apparatus.

A DRAM has a property that stored information is lost as time elapses. Accordingly, it is necessary to rewrite information of the same content before the information is lost (a refresh operation).

Further, in the case where a data read-in request is issued from an external device with respect to a certain address within a DRAM memory chip, data stored in a memory cell of the DRAM is lost simply by receiving an input signal indicating the request. In view of the above, a sense amplifier is provided as a measure against an external stimulus. There is performed a processing of returning the data evacuated in the sense amplifier back to a corresponding row in the memory array (a pre-charge operation).

In contrast, an SRAM (a Static RAM) has a property that once information is written, the written information is retained as long as electric power is continued to be supplied. In other words, the information is retained, even if a refresh operation or a pre-charge operation is not specifically performed. Thus, any address data is accessible at any time.

However, since an SRAM is comprised of a flip-flop circuit including at least four transistors per memory cell, the number of wirings is large, and it is difficult to increase the capacity. On the other hand, since a DRAM is comprised of one transistor and one capacitor, and has a simple structure, it is easy to manufacture the DRAM at a low cost and with a large capacity. In view of the above, a DRAM is used for a device requiring a large capacity, such as a main memory of a personal computer or an image buffer memory.

A DRAM has a burst transfer mode, and high-speed processing is achieved by designating an address (a leading address) and by sequentially transferring data to addresses succeeding the leading address. In the case where data is randomly accessed to a certain address, a time for the aforementioned refresh operation or pre-charge operation is required. As a result, a time required for a data readout operation increases, as compared with a case where an SRAM is used.

In an image display apparatus configured such that Lissajous scanning is performed using a two-axis resonant MEMS mirror, as employed in the present invention, the address direction of data stored in an image buffer memory is different from an actually displayed scanning direction. Accordingly, a data readout operation into the image buffer memory becomes substantially a random access operation, and the speed of displaying a scanning pixel is restricted by the pixel data readout speed from the memory.

It is necessary to perform memory access a certain number of times for generation of an address at one pixel in order to read out plural pixel data for pixel data interpolation, and a certain access time is required. As a result, it is difficult to raise the display speed of a scanning pixel. In other words, if an interpolation processing is implemented by a memory system having the same transfer rate, the display speed of a scanning pixel resultantly lowers, which makes it difficult or impossible to raise the display resolution over a predetermined value.

The conventional example as described in patent literature 1 fails to disclose an improvement on the memory access speed.

CITATION LIST

Patent Literature

Japanese Patent No. 4,379,331

SUMMARY OF INVENTION

An object of the invention is to provide a compact and energy-saving scanning type image display apparatus that enables to display an image in a satisfactory manner by interpolating pixel data using a scanning mirror, exploiting the features of the image display apparatus.

A scanning type image display apparatus according to an aspect of the invention includes: a light source portion which emits a laser beam; a frame buffer which temporarily stores, frame by frame, a plurality of pixel data inputted from outside and representing an image to be displayed on a display screen; a scanning mirror which scans the laser beam two-dimensionally in a first direction and in a second direction intersecting the first direction to project the laser beam to the display screen; a drive controller which outputs a drive signal to the scanning mirror to control the scanning mirror, and a display controller which reads out the pixel data from the frame buffer, generates display data for modulating an intensity of the laser beam using the readout pixel data, and causes the light source portion to emit an intensity-modulated laser beam based on the display data, wherein the frame buffer has a two-dimensional logical address space configured corresponding to the display screen, and stores the plurality of pixel data in address positions of the two-dimensional logical address space corresponding to respective positions on the display screen in an order in which the plurality of pixel data is inputted, in the two-dimensional logical address space of the frame buffer, a direction corresponding to the order in which the pixel data is stored is defined as an address direction, the drive controller drives the scanning mirror so that the laser beam is scanned in a direction nonparallel to a direction corresponding to the address direction on the display screen, and outputs, to the display controller, information relating to the drive signal to be outputted to the scanning mirror, the display controller calculates a scanning position of the laser beam on the display screen by the scanning mirror based on the information relating to the drive signal inputted from the drive controller, reads out a plurality of pixel data including pixel data stored in an address position of the two-dimensional logical address space corresponding to the calculated scanning position on the display screen or a position near the scanning position by executing a burst access to the frame buffer in the address direction, and implements interpolation using the plurality of readout pixel data to generate the display data corresponding to the scanning position of the laser beam on the display screen, the scanning mirror is a resonant mirror, and driving frequencies in the first direction and in the second direction are respectively set near resonant frequencies of the scanning mirror in the first direction and in the second direction, the drive controller outputs, to the scanning mirror, the drive signal configured such that the driving frequency is discretely set with an interval of a predetermined step size, and the drive controller switches, in a case where the resonant frequency of the scanning mirror in one of the first direction and the second direction varies, the driving frequency to a driving frequency at a succeeding step, before the varied resonant frequency reaches the discretely set driving frequency at the succeeding step, and switches, in response to the switching of the driving frequency, the driving frequency of the scanning mirror in the other of the first direction and the second direction while maintaining a predetermined relationship.

These and other objects, features and advantages of the present invention will become more apparent upon reading the following detailed description along with the accompanying drawings.

BRIEF DESCRIPTION OF DRAWINGS

FIGS. 5A and 5B are diagrams showing an arrangement example of the scanning type image display apparatus, wherein FIG. 5A is a plan view showing essential parts, and FIG. 5B is a side view.

FIGS. 8A and 8B are frequency characteristic diagrams showing an operation to be performed by a conventional scanning type image display apparatus, wherein FIG. 8A shows frequency characteristics of the amplitude gain of a scanning mirror, and FIG. 8B shows frequency characteristics of the phase of a scanning mirror.

FIGS. 9A and 9B are frequency characteristic diagrams showing an operation to be performed by the scanning type image display apparatus in the second embodiment of the invention, wherein FIG. 9A shows frequency characteristics of the amplitude gain of a scanning mirror, and FIG. 9B shows frequency characteristics of the phase of a scanning mirror.

DESCRIPTION OF EMBODIMENTS

In the following, embodiments of the invention are described referring to the accompanying drawings. The following embodiments are merely examples embodying the invention, and do not limit the technical features of the invention.

(First Embodiment)

Figure 1:
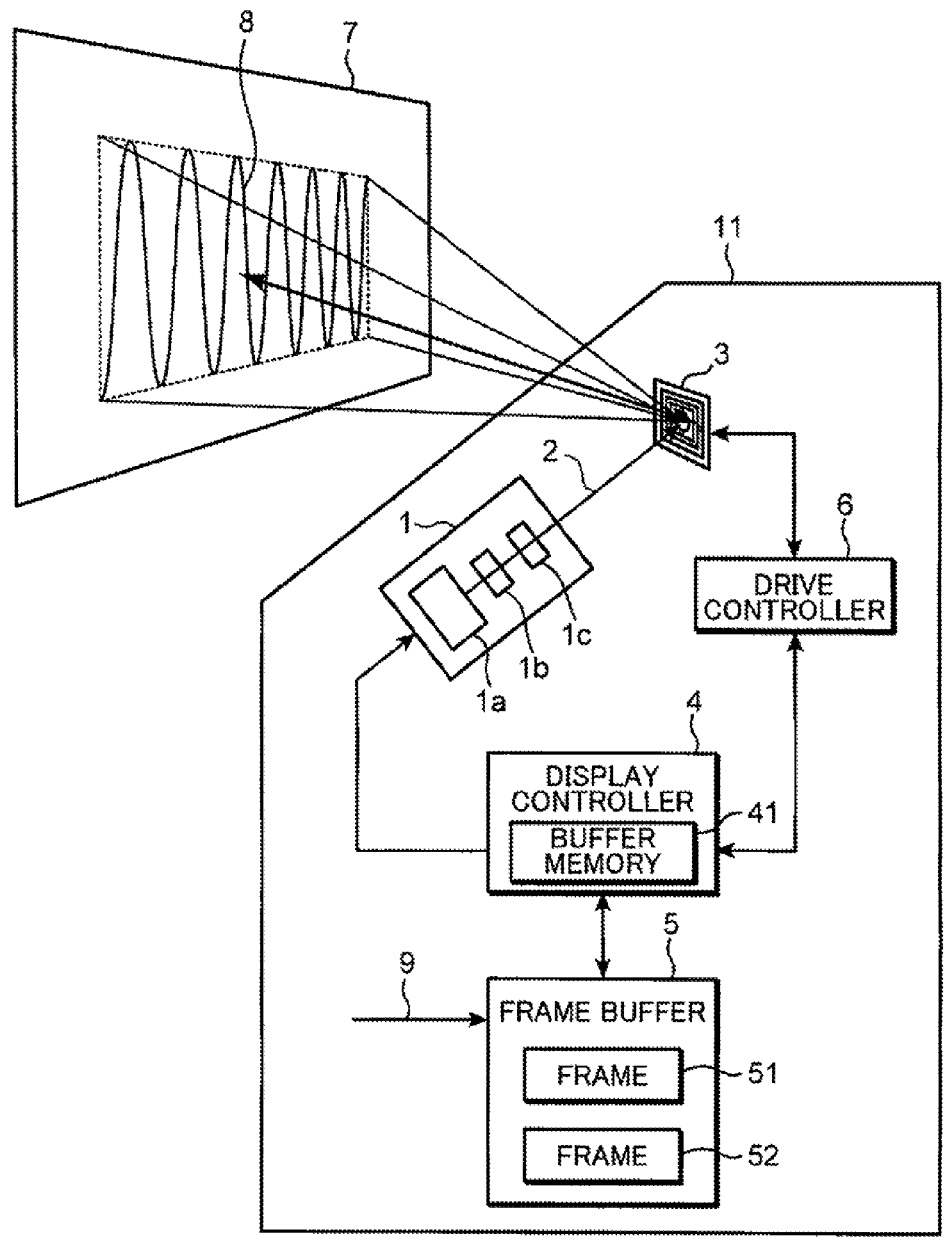
FIG. 1 is a diagram showing a schematic arrangement of a scanning type image display apparatus in a first embodiment of the invention.
Figure 2:
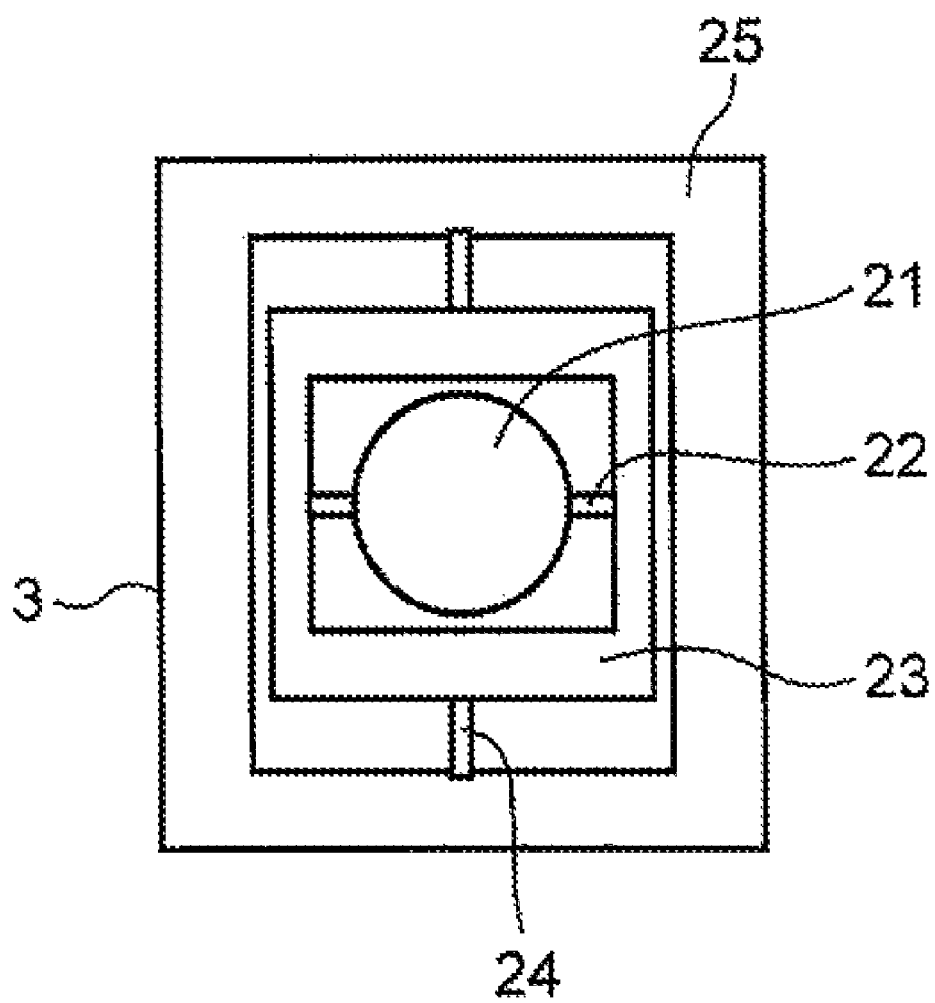
FIG. 2 is a plan view showing a schematic arrangement of a scanning mirror.

FIG. 1 a diagram showing a schematic arrangement of a scanning type image display apparatus in the first embodiment of the invention. FIG. 2 is a plan view showing a schematic arrangement of a scanning mirror.

As shown in FIG. 1, a scanning type image display apparatus 11 as a first embodiment of the invention is provided with a light source portion 1, a scanning mirror 3 (scanning means), a display controller 4, a frame buffer 5, and a drive controller 6. The light source portion 1 is provided with a laser light source 1a, a collimator lens 1b, and a light collecting lens 1c. A laser beam 2 emitted from the light source portion 1 is reflected, deflected on the scanning mirror 3, and is projected onto a projection plane 7 (a display screen).

Figure 5A:
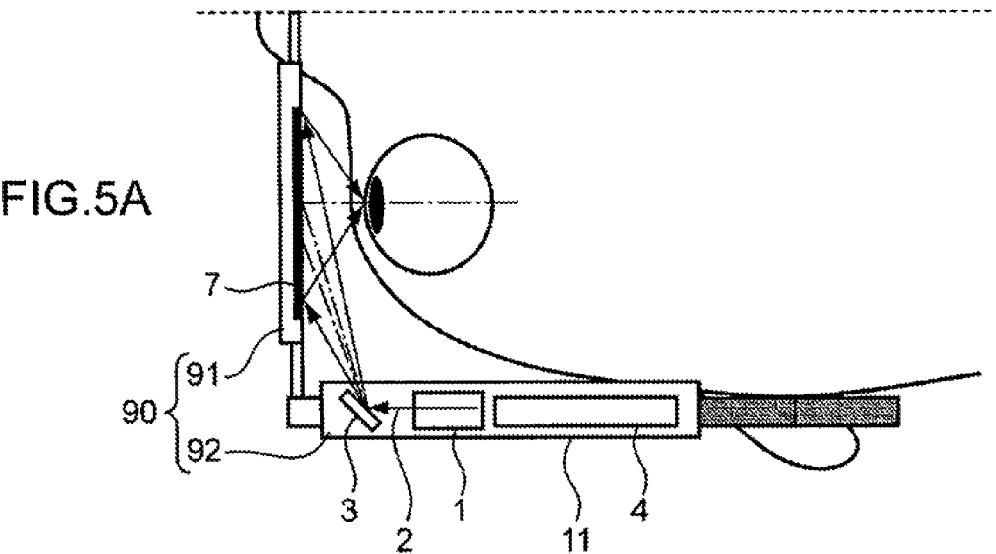
Figure 5B:
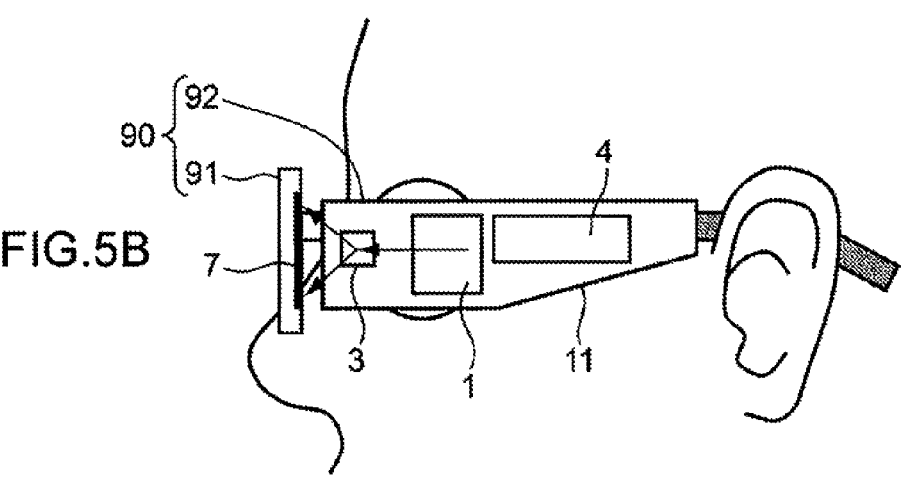
Figure 6:
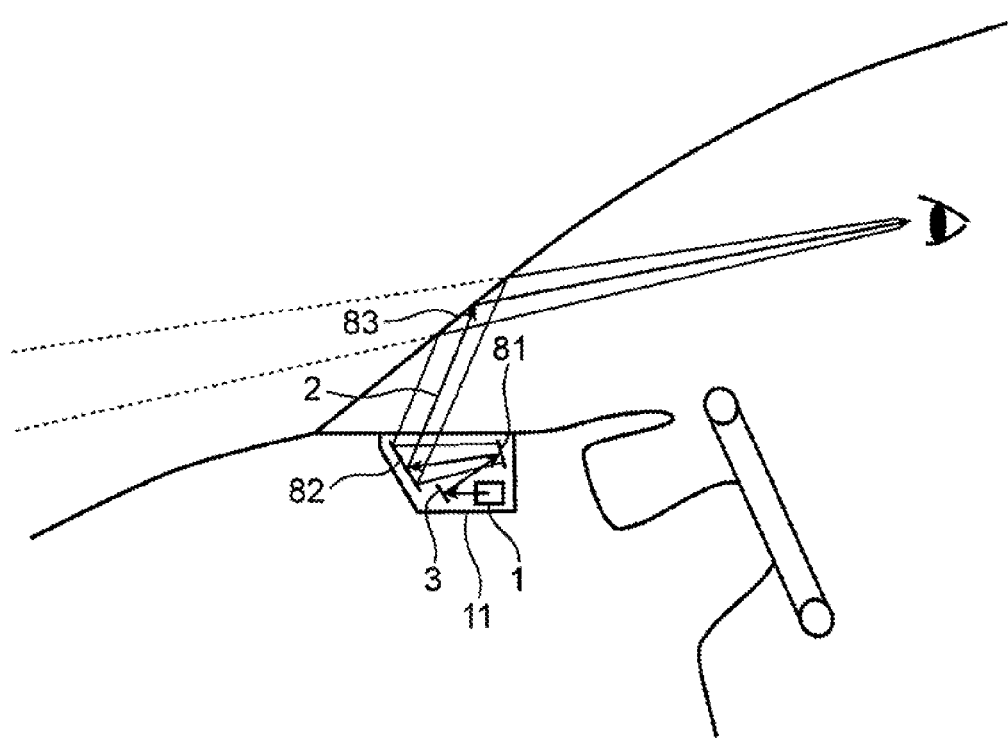
FIG. 6 is a side view showing essential parts of an arrangement example of the scanning type image display apparatus.

For instance, in the case where the scanning type image display apparatus is an eyeglass type HMD shown in FIGS. 5A, 5B, a hologram mirror formed on the surface of an eyeglass lens 91 serves as the projection plane 7. As shown in FIGS. 5A, 5B, the scanning type image display apparatus 11 is incorporated in a frame 92 of an eyeglass 90. Alternatively, as shown in FIG. 6, in the case where the scanning type image display apparatus is an HUD configured in such a manner that an image displayed on an intermediate screen 81 is irradiated onto a hologram combiner 83 on a front glass by a reflection mirror 82 to form a virtual image, the intermediate screen 81 may serve as the projection plane 7. Further alternatively, in the case where the scanning type image display apparatus is a projector, an arbitrary screen or wall surface may serve as the projection plane 7.

The frame buffer 5 is constituted of e.g. a DRAM. A plurality of input pixel data 9 is temporarily stored in the frame buffer 5. The drive controller 6 outputs a drive signal to the scanning mirror 3 for controlling the scanning mirror 3. The drive controller 6 outputs, to the display controller 4, information relating to the drive signal to be outputted to the scanning mirror 3. The display controller 4 controls the emission intensity of the laser beam 2 to be emitted from the light source portion 1, based on the pixel data 9.

The display controller 4 and the drive controller 6 may be constituted of e.g. a CPU (Central Processing Unit), a ROM (Read Only Memory) for storing a program or programs, a RAM (Random Access Memory) for storing a program or programs and/or data at the time of executing various processings, an input-output interface and a bus for connecting the CPU, the ROM, the RAM, the input-output interface, all of which are not shown. A buffer memory 41 provided in the display controller 4 will be described later.

The scanning mirror 3 is a two-axis resonant mirror which is resonantly driven in two directions i.e. a horizontal direction (a first direction) and a vertical direction (a second direction), and is configured such that a scanning beam forms a Lissajous pattern. Usually, in a raster scan system, a laser beam is scanned at a high speed in a horizontal direction, and is scanned at a low speed in a vertical direction. However, in the first embodiment of the invention, a laser beam is scanned at a high speed in a vertical direction, and is scanned at a low speed in a horizontal direction.

The scanning mirror 3 is typically a MEMS device having such a structure as shown in FIG. 2. A mirror portion 21 is supported by a support portion 22, and is held to be pivotally movable with respect to an intermediate frame 23. The intermediate frame 23 is held on a support portion 24 to be pivotally movable with respect to a fixed frame 25. A driving system of the scanning mirror 3 includes a device of a piezoelectric system, an electrostatic system, an electromagnetic system, and the like. Various modifications of the structure of the support portion have been developed depending on the driving systems. The scanning mirror in this embodiment is not limited to a specific structure or a specific driving system, and various structures and driving systems may be applied.

Further, a compact device can be implemented by resonantly driving the scanning mirror 3. For instance, a device having a size of 10 mm×10 mm, resonant frequencies in the range of from about 10 kHz to about 20 kHz and in the range of from about 200 Hz to about 2 kHz has been developed as a MEMS device of an electrostatic driving system, wherein a comb electrode is disposed e.g. between the mirror portion 21 and the intermediate frame 23, and between the intermediate frame 23 and the fixed frame 25. Further, there has also been developed a device of a piezoelectric system, wherein a piezoelectric film is formed on a support portion for resonating a movable portion, and which has substantially the same size and resonant frequencies as the device described above.

In the first embodiment, the scanning mirror 3 is driven at a low speed with a driving frequency of e.g. 1 kHz in a horizontal direction (in the first direction), and is driven at a high speed with a driving frequency of e.g. 20 kHz in a vertical direction (in the second direction).

Figure 3:
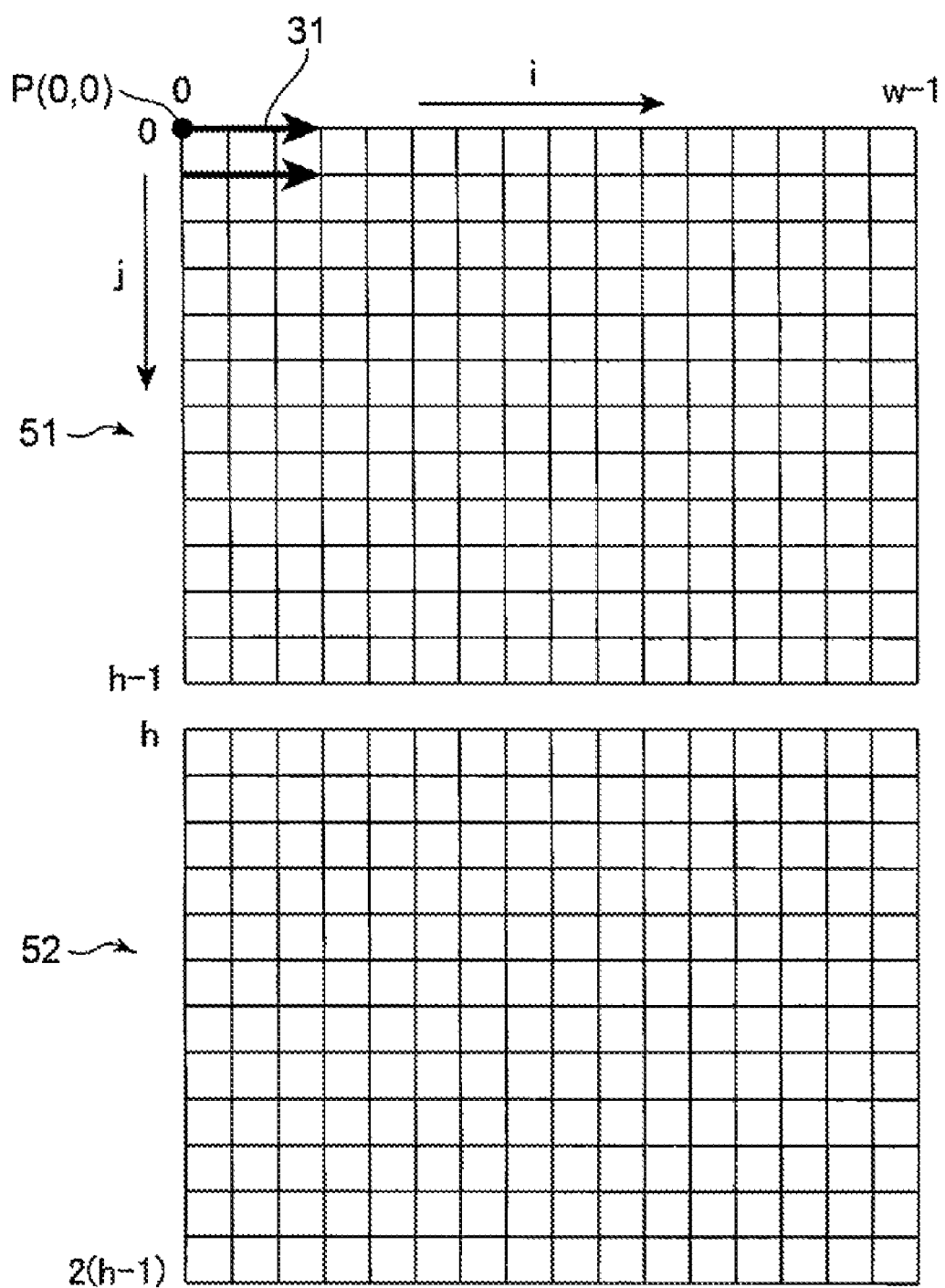
FIG. 3 is an explanatory diagram showing a logical address structure of a frame buffer.

FIG. 3 is a schematic diagram showing a logical address structure of the frame buffer 5. As shown in FIG. 3, the frame buffer 5 has a two-dimensional logical address space configured corresponding to the projection plane 7. The frame buffer 5 stores a plurality of pixel data 9 in address positions of the two-dimensional logical address space corresponding to the respective positions on the projection plane 7 in the order in which the pixel data is inputted.

In the usual raster scan system, the horizontal address (i) is defined rightwardly, and the vertical address (j) is defined downwardly, with the uppermost and leftmost position on the projection plane 7 where an image is displayed serving as the origin point. In FIG. 3 and in FIG. 4 to be described later, the value (pixel data) of a pixel is represented by P(i, j). Pixel data is transmitted one line from the value P(0, 0) rightward in the horizontal direction in the projection plane 7, and then pixel data is transmitted one line from the value P(0, 1) rightward in the horizontal direction in the projection plane 7. Thus, pixel data is successively transmitted line after line in order, and is stored in the address positions of the frame buffer 5 corresponding to the respective positions on the projection plane 7. The arrow 31 in FIG. 3 indicates the data writing order (in other words, the order in which the pixel data is stored into the frame buffer 5).

In the case where an input image is a moving image, a so-called double buffer is configured by securing a memory area corresponding to two frames (a frame 51 and a frame 52 as shown in FIG. 1), wherein one frame (w×h) is constituted of pixels of an image, with the number of pixels in a horizontal direction being (w), and the number of pixels in a vertical direction being (h). This is performed to implement a writing operation of the pixel data 9 to be inputted, and a readout operation of pixel data by the display controller 4 independently of each other for preventing memory access violation and for enabling smooth data reading/writing operation. Specifically, the display controller 4 reads out pixel data from the frame 52 during a time when pixel data to be inputted is written into the frame 51.

In this example, regarding the frame addresses, let it be assumed that the address of the frame 51 is fr=0, the address of the frame 52 is fr=1, the horizontal address (i) is I=0 through w−1, and the vertical address (j) is j=0 through h−1. In this case, assuming that the address Addr to be written into the frame buffer 5 is expressed by the following formula (1), $$Addr=4\{fr \times w \times h+(j \times w)+i\} \quad (1)$$

the frame buffer 5 has a two-dimensional two-frame structure as shown in FIG. 3. In the formula (1), the number 4 represents that the reading/writing unit of a memory is 1 word=4 bytes. 8-bit pixel data of each of R, G, B is read and written in the unit of 1 word.

As is clear from FIG. 3, the horizontal direction of an image is defined as the address order in the frame buffer 5. The display controller 4 calculates an address of a pixel of an image to be displayed, from a deflection direction of a beam to be derived from a drive signal of the scanning mirror 3 which is outputted from the drive controller 6, reads out pixel data corresponding to the calculated address from the frame buffer 5, and modulates the emission intensity of the laser beam 2 emitted from the light source portion 1 based on the readout result. It is possible to display an intended image by modulating the emission intensity of the laser beam 2 by the display controller 4.

In other words, the display controller 4 calculates a scanning position of the laser beam 2 on the projection plane 7 based on information relating to the drive signal to be inputted from the drive controller 6. The display controller 4 reads out, from the frame buffer 5, pixel data in the address position of the frame buffer 5 corresponding to the calculated scanning position of the laser beam 2 on the projection plane 7 or a position near the scanning position. The display controller 4 generates display data for modulating the intensity of the laser beam 2, using the readout pixel data.

Figure 4:
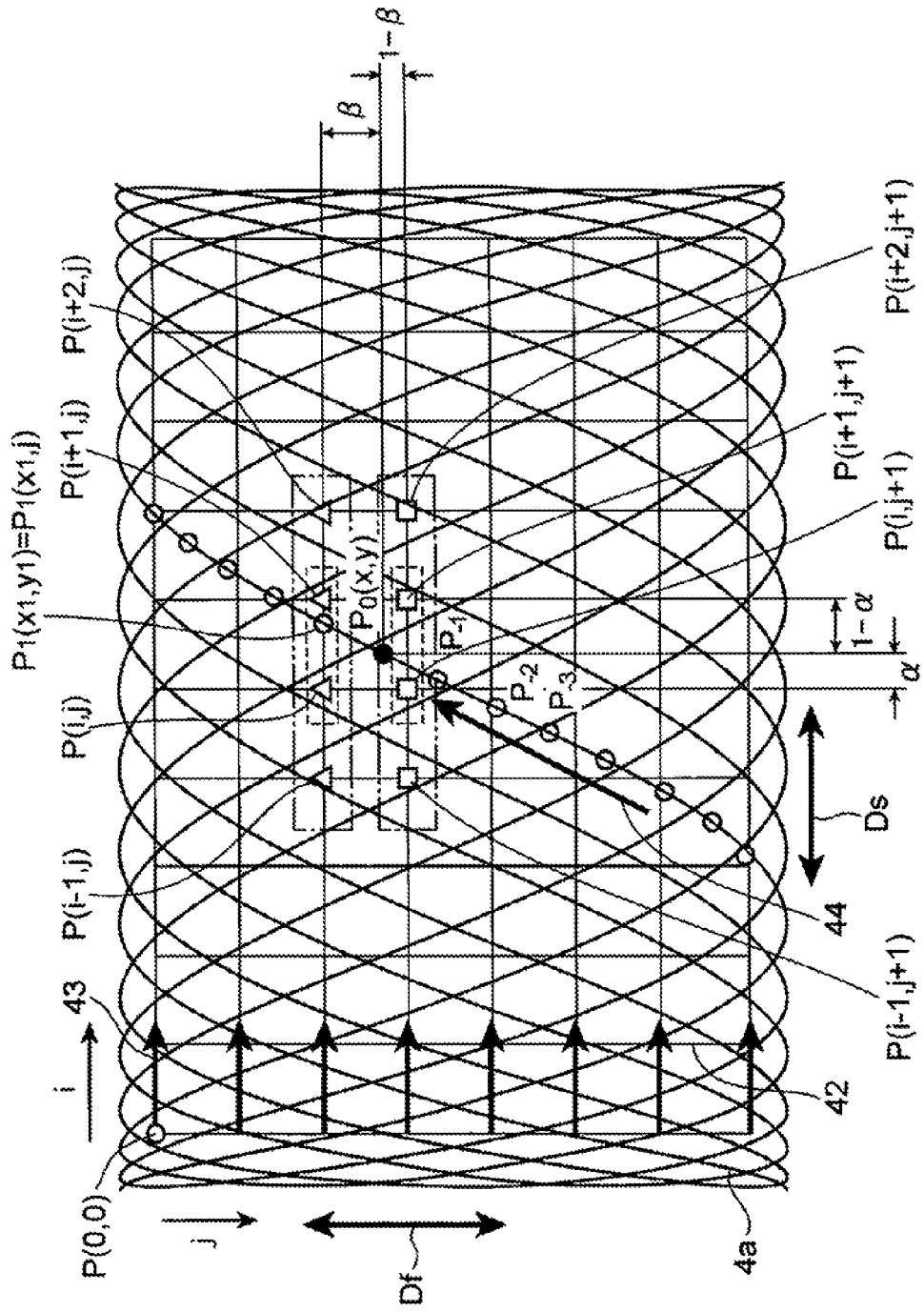
FIG. 4 is an explanatory diagram showing an operation to be performed by the scanning type image display apparatus in the first embodiment of the invention.

FIG. 4 is an explanatory diagram showing an operation to be performed by the scanning type image display apparatus in the first embodiment of the invention. The outermost periphery of a scan area with respect to a scanning trajectory 4a i.e. the trajectory of a beam to be formed by the scanning mirror 3 serves as a non-display area, and a pixel grid pattern 42 is formed in the inside of the non-display area. Pixel data is stored in the frame buffer 5, as data at the respective nodes of the pixel grid pattern 42.

The scanning mirror 3 is resonantly driven along two axes. Since the laser beam 2 scans the scan area with a so-called Lissajous pattern, the scanning trajectory 4a has a sinusoidal waveform. Since the laser beam 2 scans in a vertical direction Df at a high speed, the scanning trajectory 4a is shifted in a horizontal direction Ds at a low speed, while reciprocating substantially in a vertical direction at a high speed. Specifically, for instance, assuming that the driving frequency of the scanning mirror 3 in a vertical direction corresponding to a high-speed scanning is set to 20 kHz, and the driving frequency of the scanning mirror 3 in a horizontal direction corresponding to a low-speed scanning is set to 1 kHz, since the frequency ratio is 20:1 and the difference is large, a scanning direction 44 of the laser beam 2 substantially coincides with the vertical direction. In FIG. 4, to simplify the description, the frequency ratio or the frequency difference between the high-speed scanning and the low-speed scanning is expressed by a small value. Accordingly, the scanning direction 44 is not indicated as a direction close to a vertical direction in FIG. 4.

In this example, there are described several approaches for generating display data by the display controller 4. Firstly, a simplest approach without accompanying interpolation is described. This approach uses pixel data P0(x, y), in the case where the laser beam 2 is located at a point (x, y).

$$P0(x,y)=P([x],[y])=P(i,j) \quad (2)$$

where [x] is a Gaussian symbol representing an integer which does not exceed (x). Specifically, approximating by rounding off the number of the coordinate (x, y) to the closest whole number is the simplest method for generating display data. In this case, it is only necessary to read out one pixel data from the frame buffer 5 for determining pixel data at one point.

Next, an approach as to how one-dimensional interpolation is implemented is described. In this example, the horizontal direction coincides with a direction on the projection plane 7 corresponding to an address direction 43 of pixel data in the frame buffer 5, with respect to the scanning direction 44 i.e. a substantially vertical direction to a direction on the projection plane 7 corresponding to the address direction 43 of pixel data. In view of this, the display controller 4 reads out a plurality of pixel data by a one-time memory access by executing a burst access to the frame buffer 5 constituted of a DRAM.

For instance, a case where display data P0(x, y) is obtained is described in the same manner as described above. Executing a two-word burst access to the frame buffer 5 using P(i, j) as a leading address enables to successively read out two pixel data i.e. pixel data P(i, j) and pixel data P(i+1, j) by a one-time memory access. Then, the pixel data P0(x, y) at the position of a point (x, y) is obtained by implementing the formula (3) using these values.

$$P0(x,y)=(1-\alpha)P(i,j)+\alpha P(i+1,j) \quad (3)$$

where α=x−i. Thus, the display controller 4 is operable to determine the display data P0(x, y) by implementing one-dimensional interpolation in a horizontal direction.

Further alternatively, a four-word burst access may be executed with respect to P0(x, y), using P(i−1, j) as the leading address. In this case, higher order interpolation may be implemented, using four pixel data at four points i.e. pixel data P(i−1, j), P(i, j), P(i+1, j), P(i+2, j).

For instance, use of a third-order spline interpolation as expressed by the following interpolation formula (4) yields high-precision interpolation:

$$P0(x,y)=[\{a\alpha+b(1-\alpha)\}\alpha+c(1-\alpha)]\alpha+d(1-\alpha) \quad (4)$$

where
 a=P(i+1, j),
 b=0.2{3P(i−1, j)−7P(i, j)+12P(i+1, j)−3P(i+2, j)},
 c=0.2{−4P(i−1, j)+6P(i, j)+4P(i+1, j)−P(i+2, j)},
 d=P(i, j),
 α=x−i.

Further alternatively, an interpolation formula may be selected, as necessary, depending on a required interpolation precision.

As described above, the display controller 4 calculates a scanning position (x, y) of the laser beam 2 on the projection plane 7 by the scanning mirror 3, based on information relating to a drive signal inputted from the drive controller 6. The display controller 4 executes a burst access to the frame buffer 5 in the address direction 43 to read out a plurality of pixel data including pixel data stored in the address position of the frame buffer 5 corresponding to a position near the calculated scanning position (x, y). For instance, in the case where a two-word burst access is executed, the display controller 4 successively reads out two pixel data i.e. pixel data P(i, j) and pixel data P(i+1, j) by a one-time memory access. Then, the display controller 4 implements one-dimensional interpolation using the plurality of readout pixel data, and generates display data P0(x, y) corresponding to the scanning position (x, y) of the laser beam 2.

The display controller 4 determines the leading address for use in executing a burst access, based on the address position in the frame buffer 5 corresponding to the calculated scanning position of the laser beam 2 on the projection plane 7. For instance, in the case where a two-word burst access is executed, the display controller 4 determines the leading address so that the address position corresponding to the scanning position on the projection plane 7 is interposed between two pixel data (in other words, the address position corresponding to the scanning position is located between the address positions of two pixel data) in the address direction 43 (or in the horizontal direction (i)). Further, for instance, in the case where a four-word burst access is executed, the display controller 4 determines the leading address so that the address position corresponding to the scanning position on the projection plane 7 is interposed between two pixel data and two pixel data (in other words, the address position corresponding to the scanning position is located between the address positions of the middle two pixel data) in the address direction 43 (or in the horizontal direction (i)). Determining the leading address as described above allows the display controller 4 to properly obtain display data by implementing one-dimensional interpolation.

Next, an approach as to how two-dimensional interpolation is implemented is described. Pixel data read out at a point (P−1) which immediately precedes the point P in the scanning direction 44 may be stored in the buffer memory 41 in the display controller 4 for interpolation to obtain next display data P0(x, y). In this case, a horizontal and vertical two-dimensional interpolation formula is applied. The buffer memory 41 may be constituted of a small-capacity memory such as an SRAM or a block RAM within an FPGA.

Specifically, the following formula (5) is implemented by reading out pixel data P(i, j) and pixel data P(i+1, j) by executing a two-word burst access; and by using four pixel data i.e. the pixel data P(i, j) and the pixel data P(i+1, j), and the pixel data P(i, j+1) and the pixel data P(i+1, j+1) that have been read out by the preceding burst access and stored in the buffer memory 41:

$$P0(x,y)=(1-\alpha)(1-\beta)P(i,j)+\alpha(1-\beta)P(i+1,j)+(1-\alpha)P(i,j+1)+\alpha P(i+1,j+1) \quad (5)$$

where α=x−i, β=y−j.

As described above, the display controller 4 stores, into the buffer memory 41, the two pixel data P(i, j+1), P(i+1, j+1) that have been read out by executing a burst access to the frame buffer 5, and thereafter, reads out the two pixel data P(i, j), P(i+1, j) by re-executing a burst access to the frame buffer 5. The address positions (j) of the two pixel data P(i, j), P(i+1, j) that have been read out by re-executing a burst access are located on the opposite side with respect to the address positions (j+1) of the two pixel data P(i, j+1), P(i+1, j+1) that have been stored in the buffer memory 41 in the scanning direction 44 (in a direction substantially orthogonal to the address direction 43) of the laser beam 2 by the scanning mirror 3, with respect to the address position in the frame buffer 5 corresponding to the scanning position (x, y) of the laser beam 2 on the projection plane 7.

Further, in the case where the address position in the frame buffer 5 corresponding to the scanning position (x, y) of the laser beam 2 on the projection plane 7 is shifted away from a position between the address position (j+1) and the address position (j) of pixel data that have been readout by the two-time burst access in the scanning direction 44 (in a direction substantially orthogonal to the address direction 43) of the laser beam 2 by the scanning mirror 3, the display controller 4 reads out two pixel data from the frame buffer 5 by executing a succeeding burst access.

For instance, display data (P−3) obtained three times before the current display data P0 is obtained, and display data (P−2) obtained two times before the current display data P0 is obtained are located in a frame of the same pixel grid pattern 42 in the vertical direction (j) (or in the scanning direction 44). Thus, the display controller 4 obtains both the display data (P−3) and the display data (P−2), using the pixel data at the address position (j+3) and the pixel data at the address position (j+2). On the other hand, display data (P−1) obtained one time before the current display data P0 is shifted to the inside of a frame immediately above the aforementioned frame of the pixel grid pattern 42 in the vertical direction (j) (or in the scanning direction 44). Therefore, the display controller 4 reads out pixel data at a succeeding address position (j+1) by executing a burst access. On the other hand, the display controller 4 discards the pixel data at the address position (j+3) stored in the buffer memory 41, because the pixel data at the address position (j+3) is not necessary any more; and updates and stores the pixel data at the address position (j+2) into the buffer memory 41. The display controller 4 obtains display data (P−1), using the pixel data at the address position (j+2) and the pixel data at the address position (j+1).

As described above, the display controller 4 discards the unwanted pixel data from the buffer memory 41, and updates and stores only necessary pixel data into the buffer memory 41. This is advantageous in minimizing the capacity required for the buffer memory 41.

Alternatively, the display controller 4 may implement the following interpolation, in place of the aforementioned interpolation. For instance, as shown in FIG. 4, the address position in the frame buffer 5 corresponding to a scanning position (x1, y1) succeeding the current scanning position (x, y) of the laser beam 2 by the scanning mirror 3 is located on a grid of the pixel grid pattern 42, and y1=j. In other words, the address position in the frame buffer 5 corresponding to the scanning position (x1, y1) and the address positions of pixel data P(i, j), P(i+1, j) coincide with each other in the vertical direction (j) (or in the scanning direction 44). In this case, the display controller 4 implements one-dimensional interpolation, using the pixel data at the address position (j) to obtain display data P1(x1, y1). On the other hand, in the case where the address position in the frame buffer 5 corresponding to the scanning position is not located on a grid of the pixel grid pattern 42, and the address position in the frame buffer 5 corresponding to the scanning position (x, y) and the address positions of pixel data do not coincide with each other in the vertical direction (j) (or in the scanning direction 44), as exemplified by the current scanning position (x, y), the display controller 4 implements two-dimensional interpolation to obtain display data. With the aforementioned control, the display controller 4 is operable to properly obtain display data corresponding to a scanning position of the laser beam 2 on the projection plane 7, while switching between the one-dimensional interpolation and the two-dimensional interpolation.

With the above configuration, in the first embodiment, an image is displayed on the projection plane 7 by a scanning technique different from the usual raster scan, using the scanning mirror 3 which is resonantly driven along two axes. In this case, the scanning mirror 3 scans the laser beam 2 in the scanning direction 44 i.e. in a direction substantially perpendicular to the direction on the projection plane 7 corresponding to the address direction 43 along which the pixel data 9 is stored in the frame buffer 5. The display controller 4 reads out pixel data at both sides of the scanning direction 44 by a one-time burst access. In other words, the display controller 4 reads out, from the frame buffer 5, a plurality of pixel data stored in the address positions, with the address position in the frame buffer 5 corresponding to the scanning position of the laser beam 2 on the projection plane 7 being interposed, by executing a burst access in the address direction 43 (i.e. in the horizontal direction (i)). The display controller 4 is operable to implement one-dimensional interpolation, using the plurality of readout pixel data. Further, the display controller 4 is operable to implement two-dimensional interpolation, using pixel data preceding and succeeding target pixel data in the scanning direction 44 by storing the already readout pixel data into the buffer memory 41. With this arrangement, the display controller 4 is operable to read out a plurality of pixel data from the frame buffer 5, and to generate display data corresponding to the scanning position of the laser beam 2 on the projection plane 7 by implementing interpolation, without lowering the display rate. Thus, in the first embodiment, the quality of a display image can be enhanced.

As described in the first embodiment, scanning the laser beam 2 in a vertical direction, in other words, scanning the laser beam 2 at a higher speed in a vertical direction (in the second direction) than in a horizontal direction (in the first direction) by the scanning mirror 3 provides the following advantages.

Usually, regarding the support portions of the scanning mirror 3, the rigidity of the support portion 24 corresponding to the low-speed scanning is lower than the rigidity of the support portion 22 corresponding to the high-speed scanning. Accordingly, it is possible to easily resonate the scanning mirror 3 at a large amplitude. In view of this, setting the direction of the high-speed scanning along a vertical direction and setting the direction of the low-speed scanning along a horizontal direction, as described in the first embodiment, is advantageous in displaying a laterally long wide screen as the projection plane 7.

Further, in the eyeglass type HMD as shown in FIGS. 5A and 5B, the laser beam 2 is obliquely projected from a side onto the hologram mirror of the eyeglass lens 91 as the projection plane 7. In view of this, the eyeglass type HMD is configured in such a manner that the projection distance differs between a right portion and a left portion on the screen. Therefore, it is desirable to synchronize focus control of the laser beam 2 in the horizontal direction in order to display a clear image over the entirety of the screen. In view of this, the scanning type image display apparatus 11 to be applied to the eyeglass type HMD shown in FIGS. 5A and 5B may be so configured that the light collecting lens 1c of the light source portion 1 is movable in the optical axis direction, and that the display controller 4 controls the position of the light collecting lens 1c on the optical axis in synchronization with horizontal scanning of the scanning mirror 3 by the drive controller 6. Thus, with use of the eyeglass type HMD, it is possible to display a clear image over the entirety of the projection plane 7. Further, in the first embodiment, since the high-speed scanning is performed in the vertical direction and the low-speed scanning is performed in the horizontal direction, the above arrangement is advantageous in setting the operating frequency of a focus control system to be operated in the horizontal direction to a low value.

(Second Embodiment)

Figure 7:
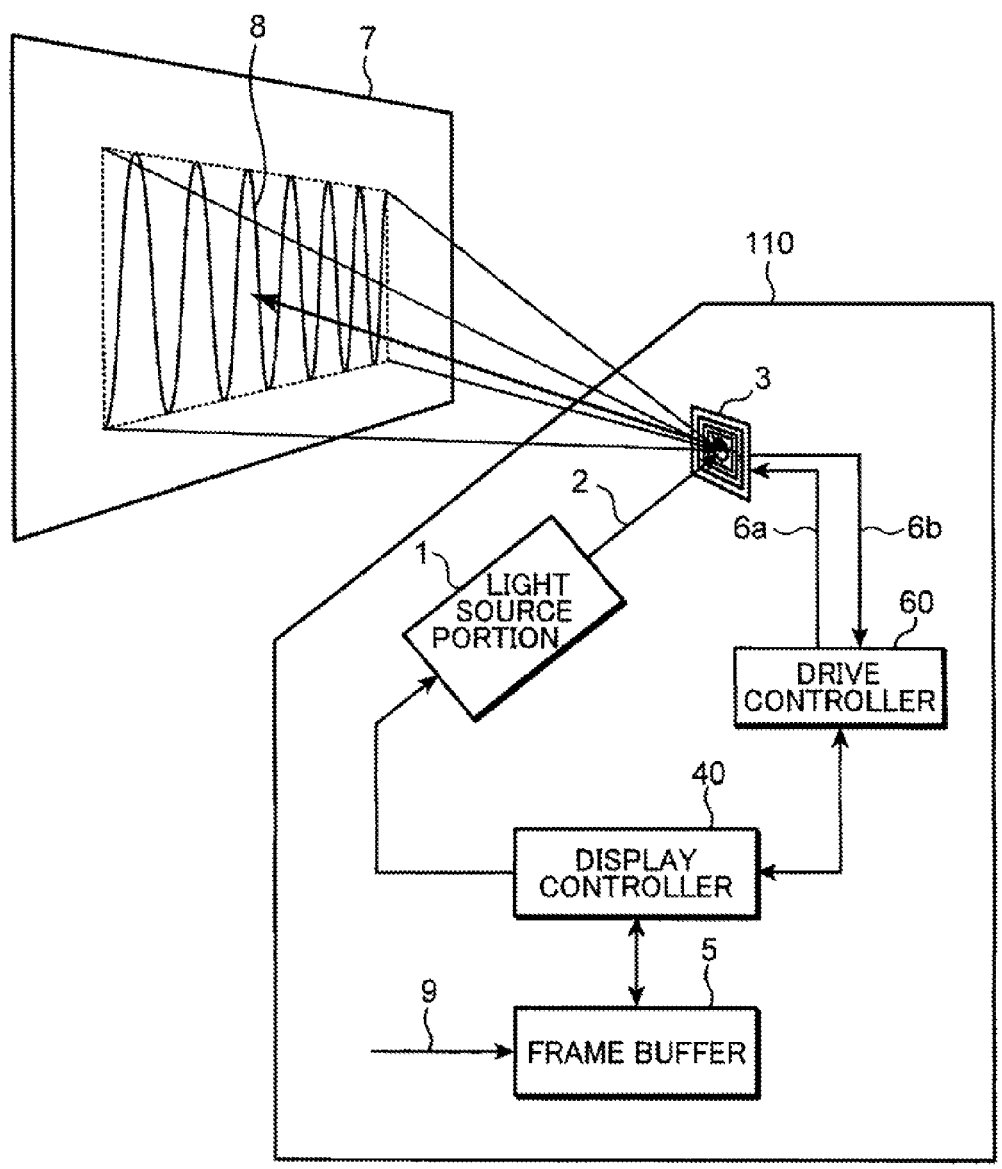
FIG. 7 is a diagram showing a schematic arrangement of a scanning type image display apparatus in a second embodiment of the invention.

FIG. 7 is a diagram showing a schematic arrangement of a scanning type image display apparatus in the second embodiment of the invention. In FIG. 7, substantially the same or identical elements as those in the first embodiment are indicated with the same reference signs.

As shown in FIG. 7, a scanning type image display apparatus 110 in the second embodiment is provided with a light source portion 1, a scanning mirror 3 (scanning means), a display controller 40, a frame buffer 5, and a drive controller 60. The light source portion 1 is provided with a laser light source, a collimator lens, and a light collecting lens, all of which are not shown. A laser beam 2 emitted from the light source portion 1 is reflected, deflected on the scanning mirror 3, and is projected onto a projection plane 7.

The display controller 40 controls the emission intensity of the laser beam 2 to be emitted from the light source portion 1. The drive controller 60 outputs a drive signal 6a to the scanning mirror 3, and at the same time, detects an amplitude and a phase difference of the scanning mirror 3 based on a feedback signal 6b from the scanning mirror 3 for controlling the driving of the scanning mirror 3. The display controller 40 and the drive controller 60 may be constituted of e.g. a CPU (Central Processing Unit), a ROM (Read Only Memory) for storing a program or programs, a RAM (Random Access Memory) for storing a program or programs and/or data at the time of executing various processings, an input-output interface and a bus for connecting the CPU, the ROM, the RAM, the input-output interface, all of which are not shown.

The drive controller 60 generates a frequency of the drive signal 6a by counting an operation clock of a system. Since the resonant type scanning mirror 3 reciprocates for scanning, an up-and-down counter is configured, and a count value from the counter is converted into sine wave and outputted as the drive signal 6a. In this way, the frequency of the drive signal 6a is determined by a clock count value of a half cycle of the sine wave, and a settable frequency step is one count of the half cycle.

Specifically, assuming that the operation clock is represented by Clk (Hz), the set frequency step Δf is expressed by the following formula (6) in the vicinity of the driving frequency f (Hz).

$$\Delta f = Clk/Cnt/2 - Clk/(Cnt+1)/2 \qquad (6)$$
$$= Clk/\{2Cnt(Cnt+1)\}$$
$$= 2f^2/(Clk+2f)$$

where the clock count value Cnt of the half cycle is Cnt/Clk=1/(2f).

For instance, in the case where the driving frequency is set to 30 kHz, Δf=18 Hz at the operation clock of 100 MHz, and Δf=9 Hz at the operation clock of 200 MHz.

The scanning mirror 3 is a two-axis resonant mirror which is resonantly driven along two axes i.e. in a horizontal direction (in the first direction) and in a vertical direction (in the second direction), and is configured so that a scanning beam forms a Lissajous pattern. Usually, a laser beam is scanned at a high speed in a horizontal direction, and is scanned at a low speed in a vertical direction, but the scanning speeds may be opposite. In the second embodiment, high speed scanning may be performed in either direction.

Pixel data 9 to be inputted is stored in the frame buffer 5. The drive controller 60 outputs information relating to the drive signal 6a to the display controller 40. The display controller 40 calculates an address of a pixel of an image to be displayed, from the deflection direction of the laser beam 2 to be derived from the drive signal 6a of the scanning mirror 3. The display controller 40 reads out pixel data corresponding to the calculated address from the frame buffer 5, and generates display data based on the readout pixel data. Display data may be generated by the display controller 40 by any one of the generation methods by the display controller 4 as described in the first embodiment. Specifically, the display controller 40 may generate display data by any one of the methods i.e. a method for rounding off the number to the closest whole number without implementing interpolation, a method for implementing one-dimensional interpolation, and a method for implementing two-dimensional interpolation. The display controller 40 modulates the emission intensity of the laser beam 2 emitted from the light source portion 1 based on the generated display data. It is possible to display an intended image by modulating the emission intensity by the display controller 40.

The scanning mirror 3 is, as in the first embodiment, typically a MEMS device having substantially the same structure as the one shown in FIG. 2. A mirror portion 21 is supported by a support portion 22, and is held to be pivotally movable with respect to an intermediate frame 23. The intermediate frame 23 is held on a support portion 24 to be pivotally movable with respect to a fixed frame 25. The driving system of the scanning mirror 3 includes a device of a piezoelectric system, an electrostatic system, an electromagnetic system, and the like. Various modifications of the structure of the support portion have been developed depending on the driving systems. The scanning mirror in this embodiment is not limited to a specific structure or a specific driving system, and various structures and driving systems may be applied.

Further, a compact device can be implemented by resonantly driving the scanning mirror 3. For instance, a device having a size of 10 mm×10 mm, resonant frequencies in the range of from about 20 kHz to about 30 kHz and in the range of from about 200 Hz to about 2 kHz has been developed as a MEMS device of an electrostatic driving system, wherein a comb electrode is disposed between the mirror portion 21 and the intermediate frame 23, and between the intermediate frame 23 and the fixed frame 25. Further, there has also been developed a device of a piezoelectric system, wherein a piezoelectric film is formed on a support portion for resonating a movable portion, and which has substantially the same size and resonant frequencies as the device described above.

Further, in the second embodiment, in each one of the systems, the feedback signal 6b representing an oscillatory waveform of the scanning mirror 3 is generated for controlling the driving of the scanning mirror 3 by the drive controller 60.

In the piezoelectric system, a piezoelectric film for generating a feedback signal is formed on the support portion 22 in alignment with a piezoelectric film for driving to generate the feedback signal 6b in accordance with vibrations of the mirror portion 21.

In the electromagnetic system, there is proposed a method, wherein a detection coil is disposed in alignment with a coil for generating a driving force to generate the feedback signal 6b by an induced electromotive force. Alternatively, there is proposed a method for detecting a variation of a magnetic field depending on vibrations of the mirror portion 21, using an MR (a magnetic resistance effect) element.

In the electrostatic system, there is proposed a method for detecting a static capacitance of a driving portion by superimposing a harmonic on the drive signal 6a.

The scanning mirror 3 as described above is designed in such a manner that a resonant frequency corresponding to the high-speed scanning lies in the range of from 20 to 30 kHz, depending on the display resolution. With use of such a resonant frequency, the Q value often becomes about 1,000. In the case where a scanning mirror configured in such a manner that Q=1,000 at a resonant frequency of 30 kHz is used, the half bandwidth HW of the amplitude gain becomes about HW=30,000/1,000=30 Hz.

In the following, an operation to be performed by the scanning type image display apparatus is described, referring to frequency characteristic diagrams on the amplitude gain and the phase of the scanning mirror 3.

Figure 8A:
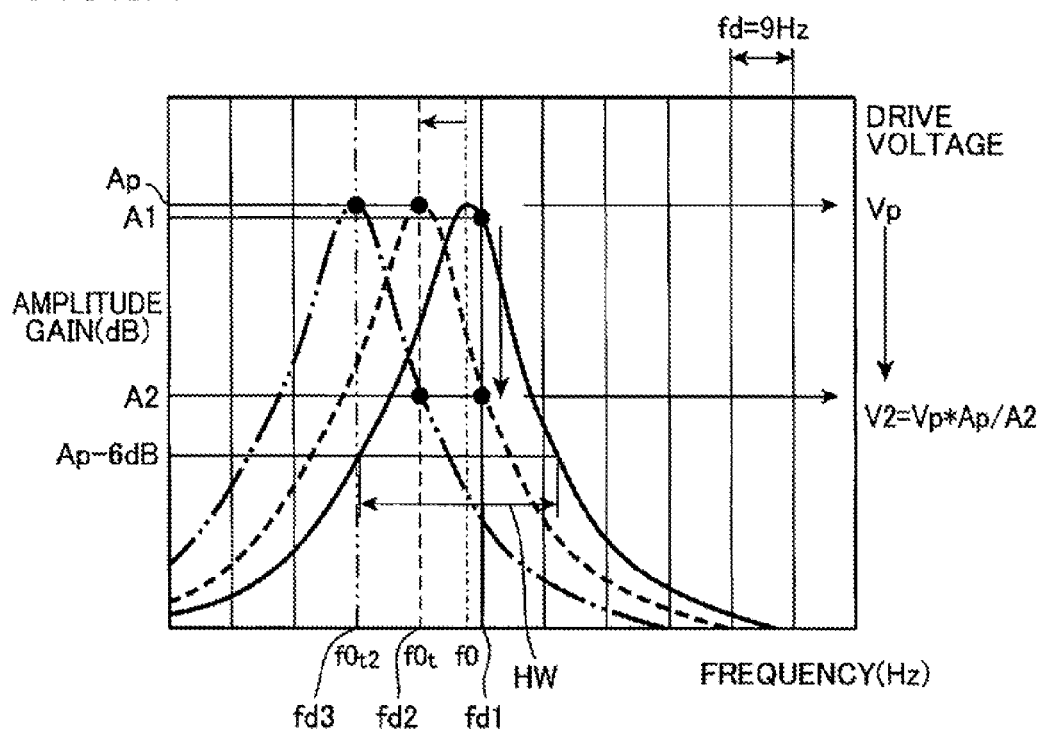
Figure 8B:
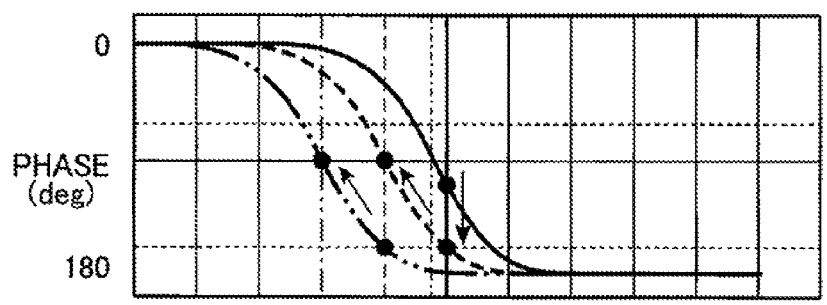

FIGS. 8A and 8B are frequency characteristic diagrams showing an operation to be performed by a conventional scanning type image display apparatus, as a comparative example, wherein FIG. 8A shows frequency characteristics of the amplitude gain of a scanning mirror, and FIG. 8B shows frequency characteristics of the phase of a scanning mirror.

In the case where the resonant frequency is f0, the amplitude gain and the phase show the frequency characteristics indicated by the solid lines in FIGS. 8A and 8B. In the case where the resonant frequency f0 is about 30 kHz, the amplitude gain characteristic shows a peak characteristic such that the peak gain is Ap and the half bandwidth 14W is about 30 Hz. Further, in the case where the operating frequency is 200 MHz, the set step fd for the driving frequency is fd=9 Hz. The phase characteristic changes from 0 deg to 180 deg, with the resonant frequency being interposed between 0 deg and 180 deg. In this case, the amplitude gain with respect to the driving frequency fd1 is A1. At this time, if the temperature rises, usually, the spring constant of the support portion of the scanning mirror lowers, and the resonant frequency f0 resultantly lowers. The driving frequency fd1 is kept unchanged, and the amplitude gain changes along the characteristic curve. When the resonant frequency reaches f0t, which is a succeeding step for the driving frequency, the characteristic curve becomes the curve indicated by the broken line in FIG. 8A, and the amplitude gain drops to A2. The output voltage of the drive signal is controlled so that an actual scanning amplitude is kept to a constant value during the above operation.

Specifically, the drive voltage V2 at the amplitude gain A2 with respect to the drive voltage Vp at the amplitude gain Ap is controlled to satisfy the following formula (7).

$$V2=Vp \times Ap/A2 \qquad (7)$$

This is implemented by controlling the drive voltage by PID control and the like to keep the amplitude of the feedback signal from the scanning mirror to a constant value.

Here, it is necessary to switch the driving frequency to fd2=f0t so that the driving frequency follows a variation of the resonant frequency. Then, the amplitude gain sharply increases from A2 to Ap, and the actual scanning amplitude greatly changes. As a result, a feedback signal is detected, and the drive voltage is controlled to attain the value Vp. However, since the set step for the driving frequency is relatively large, a change in the amplitude gain is large from A2 to Ap, which unavoidably leads to an instantaneous variation of the scanning amplitude.

Then, as the temperature further rises, and the driving frequency has reached the succeeding frequency step, the characteristic curve becomes the curve as indicated by the two-dotted chain line in FIG. 8A. In this case, the amplitude gain drops to A2 again, and the amplitude gain becomes Ap by switching the driving frequency to fd3=f0t2.

As described above, if the set step for the driving frequency is large, the amplitude gain greatly fluctuates, as the driving frequency follows a variation of the resonant frequency. Thus, it is extremely difficult to keep the actual scanning amplitude to a constant value.

In view of the above, in the second embodiment of the invention, a variation of the amplitude is suppressed by modifying a switching timing of the frequency.

Figure 9A:
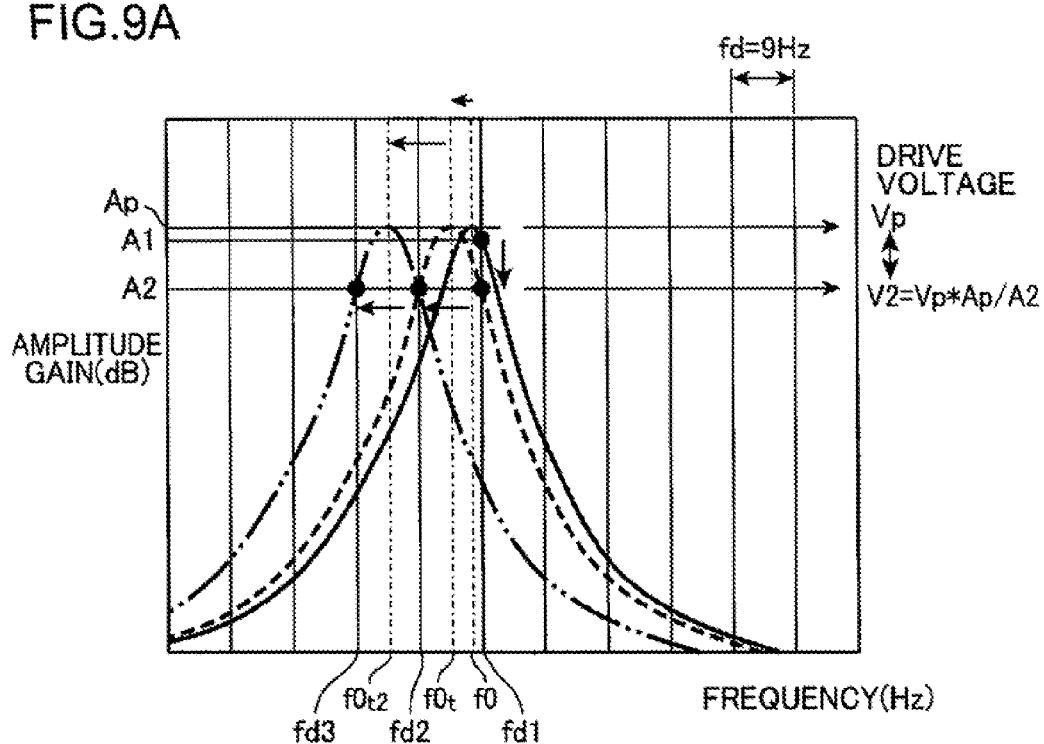
Figure 9B:
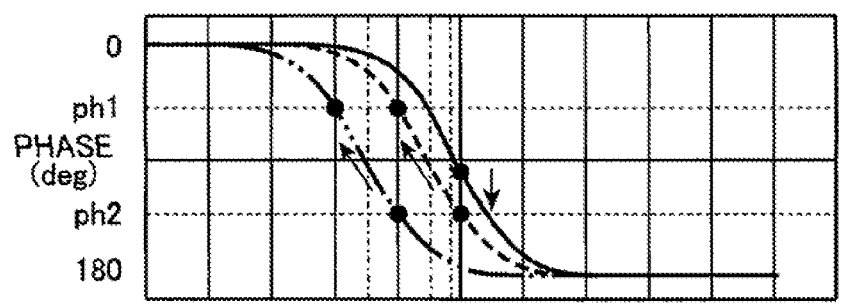

FIGS. 9A and 9B are frequency characteristic diagrams showing an operation to be performed by the scanning type image display apparatus in the second embodiment of the invention. FIG. 9A shows frequency characteristics of the amplitude gain of the scanning mirror 3, and FIG. 9B shows frequency characteristics of the phase of the scanning mirror 3.

If the temperature rises in a state that the driving frequency is set to fd1 at the resonant frequency f0, in other words, in a state that the characteristic curve is shown by the solid-line curve in FIG. 9A, the spring constant of the support portion of the scanning mirror 3 lowers, and the resonant frequency f0 resultantly lowers. At this time, when the resonant frequency f0t reaches an intermediate point of the set step for the driving frequency, that is, when the resonant frequency f0 reaches a frequency displaced by one-half of the set step size fd, the amplitude gain drops to A2 in a state that the characteristic curve becomes the broken-line curve shown in FIG. 9A. At this time, the drive controller 60 switches the driving frequency to the succeeding step i.e. the driving frequency fd2. Then, the amplitude gain is shifted to a point corresponding to A2 on the opposite side with respect to the peak value, and the drive voltage is held to the same value V2. When the resonant frequency further lowers, and the resonant frequency f0t2 has reached the intermediate point of the succeeding step for the driving frequency, the drive controller 60 switches the driving frequency to fd3. Then, the amplitude gain is switched from A2 to A2 in the same manner as described above. Thus, it is possible to switch the driving frequency while retaining the drive voltage V2.

In the case where a switching operation of the driving frequency is performed as described above, the phase changes from ph2 to ph1. This phase difference is a phase difference corresponding to a displacement from the resonant frequency by one-half the set step fd for the driving frequency. Accordingly, the phase difference can be set to a fixed value irrespective of a variation of the resonant frequency, and can be measured in advance. Thus, the drive controller 60 is operable to determine how far the resonant frequency is displaced from the set step for the driving frequency by monitoring the phase of the feedback signal 6b from the scanning mirror 3. Specifically, in the case where the phase of the feedback signal 6b is set to ph1, ph2, the drive controller 60 may switch the driving frequency.

As described above, regarding the drive signal 6a to be outputted to the scanning mirror 3, the drive controller 60 may update the driving frequency corresponding to the high-speed scanning in accordance with a variation of the resonant frequency, and may determine the driving frequency corresponding to the low-speed scanning so that a predetermined relationship with respect to the driving frequency corresponding to the high-speed scanning is maintained, as necessary, in response to the updating.

With the above configuration, in the second embodiment, the driving frequency is discretely set with an interval of a relatively large set step, with use of the scanning mirror 3 configured to be resonantly driven along two axes. But the drive controller 60 switches the driving frequency in the case where the resonant frequency is displaced by one-half of the set step size for the driving frequency. Accordingly, it is possible to suppress an instantaneous variation of the scanning amplitude and to display an image in a satisfactory manner. Further, in the second embodiment, since the decrease amount of the amplitude gain at the time of switching the driving frequency is suppressed, the above arrangement is also advantageous in suppressing a change in the drive voltage.

In the second embodiment, the drive controller 60 switches the driving frequency in the case where the resonant frequency is displaced by one-half of the set step size for the driving frequency. The invention is not limited to the above. Alternatively, the drive controller 60 may switch the driving frequency in the case where the resonant frequency reaches an arbitrary frequency other than the intermediate value of the set step for the driving frequency. The modification is also advantageous in suppressing a variation of the drive voltage, because, decrease amount of the amplitude gain is relatively suppressed, as compared with a case where the driving frequency is switched after the resonant frequency has reached the succeeding step as shown in FIGS. 8A and 8B.

(Others)

In the first and second embodiments, a single two-axis scanning mirror 3 which performs two-dimensional scanning is used. Alternatively, two one-axis scanning mirrors may be used. Specifically, in the first and second embodiments, a two-axis resonant MEMS mirror capable of scanning along two axes with a one-chip device, as shown in FIG. 2, has been exemplified. Alternatively, two one-axis scanning MEMS mirrors may be individually used for driving in a high-speed scanning direction and in a low-speed scanning direction.

Further, in the first embodiment, the display controller 4 reads out a plurality of pixel data by a one-time memory access by executing a burst access to the frame buffer 5. Further, in the second embodiment, the drive controller 60 switches the driving frequency in the case where the resonant frequency is displaced by one-half of the set step size for the driving frequency. Alternatively, the scanning type image display apparatus of the invention may be provided with both the display controller 4 in the first embodiment and the drive controller 60 in the second embodiment. Since both the effect of the first embodiment and the effect of the second embodiment can be obtained in the modification, the modification is further advantageous in enhancing the quality of a display image.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

The aforementioned embodiments mainly include the invention having the following arrangements. Specifically, a scanning type image display apparatus according to an aspect of the invention includes a light source portion which emits a laser beam; a frame buffer which temporarily stores, frame by frame, a plurality of pixel data inputted from outside and representing an image to be displayed on a display screen; a scanning mirror which scans the laser beam two-dimensionally in a first direction and in a second direction intersecting the first direction to project the laser beam to the display screen; a drive controller which outputs a drive signal to the scanning mirror to control the scanning mirror; and a display controller which reads out the pixel data from the frame buffer, generates display data for modulating an intensity of the laser beam using the readout pixel data, and causes the light source portion to emit an intensity-modulated laser beam based on the display data, wherein the frame buffer has a two-dimensional logical address space configured corresponding to the display screen, and stores the plurality of pixel data in address positions of the two-dimensional logical address space corresponding to respective positions on the display screen in an order in which the plurality of pixel data is inputted, in the two-dimensional logical address space of the frame buffer, a direction corresponding to the order in which the pixel data is stored is defined as an address direction, the drive controller drives the scanning mirror so that the laser beam is scanned in a direction nonparallel to a direction corresponding to the address direction on the display screen, and outputs, to the display controller, information relating to the drive signal to be outputted to the scanning mirror, and the display controller calculates a scanning position of the laser beam on the display screen by the scanning mirror based on the information relating to the drive signal inputted from the drive controller, reads out a plurality of pixel data including pixel data stored in an address position of the two-dimensional logical address space corresponding to the calculated scanning position on the display screen or a position near the scanning position by executing a burst access to the frame buffer in the address direction, and implements interpolation using the plurality of readout pixel data to generate the display data corresponding to the scanning position of the laser beam on the display screen.

In the above arrangement, a light source portion emits a laser beam. A frame buffer temporarily stores, frame by frame, a plurality of pixel data inputted from outside and representing an image to be displayed on a display screen. A scanning mirror scans the laser beam two-dimensionally in a first direction and in a second direction intersecting the first direction to project the laser beam to the display screen. A drive controller outputs a drive signal to the scanning mirror to control the scanning mirror. A display controller reads out the pixel data from the frame buffer, generates display data for modulating an intensity of the laser beam using the readout pixel data, and causes the light source portion to emit an intensity-modulated laser beam based on the display data.

In the above arrangement, the frame buffer has a two-dimensional logical address space configured corresponding to the display screen, and stores the plurality of pixel data in address positions of the two-dimensional logical address space corresponding to respective positions on the display screen in an order in which the plurality of pixel data is inputted. In the two-dimensional logical address space of the frame buffer, a direction corresponding to the order in which the pixel data is stored is defined as an address direction. The drive controller drives the scanning mirror so that the laser beam is scanned in a direction nonparallel to a direction corresponding to the address direction on the display screen. The drive controller outputs, to the display controller, information relating to the drive signal to be outputted to the scanning mirror. The display controller calculates a scanning position of the laser beam on the display screen by the scanning mirror based on the information relating to the drive signal inputted from the drive controller. The display controller reads out a plurality of pixel data including pixel data stored in an address position of the two-dimensional logical address space corresponding to the calculated scanning position on the display screen or a position near the scanning position by executing a burst access to the frame buffer in the address direction. The display controller implements interpolation using the plurality of readout pixel data to generate the display data corresponding to the scanning position of the laser beam on the display screen. In this way, the display controller reads out a plurality of pixel data by executing a burst access. Thus, the above arrangement is advantageous in reading out a plurality of pixel data without executing an access operation to the frame buffer a plurality of times. Further, the display controller generates display data corresponding to a scanning position of a laser beam on the display screen by implementing interpolation using a plurality of readout pixel data. Accordingly, the above arrangement is advantageous in precisely generating display data corresponding to a scanning position of a laser beam on the display screen.

In the scanning type image display apparatus, preferably, the display controller may include a buffer memory for temporarily storing the plurality of readout pixel data obtained by executing the burst access to the frame buffer, and the display controller may, after storing the plurality of readout pixel data obtained by executing the burst access to the frame buffer into the buffer memory, read out a plurality of pixel data by re-executing the burst access to the frame buffer, and may implement two-dimensional interpolation, using the plurality of readout pixel data obtained by re-executing the burst access and the plurality of pixel data stored in the buffer memory to generate the display data corresponding to the scanning position of the laser beam on the display screen.

In the above arrangement, the display controller includes a buffer memory for temporarily storing the plurality of readout pixel data obtained by executing the burst access to the frame buffer. The display controller stores the plurality of readout pixel data obtained by executing the burst access to the frame buffer into the buffer memory, and then, reads out a plurality of pixel data by re-executing the burst access to the frame buffer. The display controller implements two-dimensional interpolation, using the plurality of readout pixel data obtained by re-executing the burst access and the plurality of pixel data stored in the buffer memory to generate the display data corresponding to the scanning position of the laser beam on the display screen. In this way, the display controller generates display data corresponding to a scanning position of a laser beam on the display screen by implementing two-dimensional interpolation using a plurality of readout pixel data individually obtained by executing a burst access two times. Thus, the above arrangement is more advantageous in precisely generating display data corresponding to a scanning position of a laser beam on the display screen.

In the scanning type image display apparatus, preferably, address positions of the plurality of readout pixel data obtained by re-executing the burst access by the display controller may be located on the opposite side of address positions of the plurality of pixel data stored in the buffer memory, in a direction substantially orthogonal to the address direction, with respect to an address position in the two-dimensional logical address space corresponding to the scanning position of the laser beam on the display screen.

In the above arrangement, address positions of the plurality of readout pixel data obtained by re-executing the burst access by the display controller are located on the opposite side of address positions of the plurality of pixel data stored in the buffer memory, in a direction substantially orthogonal to the address direction, with respect to an address position in the two-dimensional logical address space corresponding to the scanning position of the laser beam on the display screen. Accordingly, the address positions of the plurality of pixel data stored in the buffer memory, and the address positions of the plurality of readout pixel data obtained by re-executing the burst access are located on the opposite side to each other with respect to the address position in the two-dimensional logical address space corresponding to the scanning position of the laser beam on the display screen, in the direction substantially orthogonal to the address direction. Thus, the above arrangement is more advantageous in generating display data corresponding to a scanning position of a laser beam on the display screen by implementing two-dimensional interpolation.

In the scanning type image display apparatus, preferably, the display controller may generate the display data by implementing one-dimensional interpolation using the plurality of readout pixel data obtained by executing the burst access, in a case where an address position in the two-dimensional logical address space corresponding to the scanning position of the laser beam on the display screen coincides with address positions of the plurality of readout pixel data obtained by executing the burst access, in a direction substantially orthogonal to the address direction, and the display controller may generate the display data by implementing two-dimensional interpolation using the plurality of readout pixel data individually obtained by executing the burst access two times, in a case where an address position in the two-dimensional logical address space corresponding to the scanning position of the laser beam on the display screen does not coincide with address positions of the plurality of readout pixel data obtained by executing the burst access.

In the above arrangement, the display controller generates the display data by implementing one-dimensional interpolation using the plurality of readout pixel data obtained by executing the burst access, in a case where an address position in the two-dimensional logical address space corresponding to the scanning position of the laser beam on the display screen coincides with address positions of the plurality of readout pixel data obtained by executing the burst access, in a direction substantially orthogonal to the address direction. The display controller generates the display data by implementing two-dimensional interpolation using the plurality of readout pixel data individually obtained by executing the burst access two times, in a case where an address position in the two-dimensional logical address space corresponding to the scanning position of the laser beam on the display screen does not coincide with address positions of the plurality of readout pixel data obtained by executing the burst access. In this way, display data is generated by implementing one-dimensional interpolation, in a case where two-dimensional interpolation is not necessary. This arrangement is advantageous in reducing the computation amount without lowering precision in generating display data.

In the scanning type image display apparatus, preferably, the plurality of pixel data may be inputted to the frame buffer in an order of addresses by raster scan, the scanning mirror may scan the laser beam so that the first direction is aligned substantially parallel to a direction on the display screen corresponding to the address direction, and that the second direction is aligned substantially orthogonal to a direction on the display screen corresponding to the address direction, and the drive controller may drive the scanning mirror at a higher speed in the second direction than in the first direction.

In the above arrangement, the plurality of pixel data is inputted to the frame buffer in an order of addresses by raster scan. The scanning mirror scans the laser beam so that the first direction is aligned substantially parallel to a direction on the display screen corresponding to the address direction, and that the second direction is aligned substantially orthogonal to a direction on the display screen corresponding to the address direction. The drive controller drives the scanning mirror at a higher speed in the second direction than in the first direction. In this way, the scanning mirror is driven at a higher speed in the second direction substantially orthogonal to the direction on the display screen corresponding to the address direction than in the first direction substantially parallel to the direction on the display screen corresponding to the address direction. Accordingly, the scanning direction of the laser beam is close to a direction perpendicular to the direction on the display screen corresponding to the address direction. Thus, in a case where the display controller executes a burst access to the frame buffer, it is possible to read out a plurality of pixel data at address positions, with the address position in the two-dimensional logical address space corresponding to the scanning position of the laser beam on the display screen being interposed. Thus, the above arrangement is advantageous in properly implementing interpolation using a plurality of pixel data, and in properly generating display data corresponding to a scanning position of a laser beam on the display screen.

The scanning type image display apparatus may preferably further include an eyeglass having an eyeglass lens and a frame portion; and a hologram mirror which is formed on a surface of the eyeglass lens as the display screen, wherein the light source portion and the scanning mirror are disposed in the frame portion, the scanning mirror projects the scanned laser beam onto the hologram mirror in an oblique direction, the first direction is set to a direction of changing a projection distance from the scanning mirror to the hologram mirror, the drive controller drives the scanning mirror at a higher speed in the second direction than in the first direction, and the display controller controls the light source portion to control focusing of the laser beam depending on a scanning position of the laser beam on the hologram mirror in the first direction.

In the above arrangement, an eyeglass includes an eyeglass lens and a frame portion. A hologram mirror is formed on a surface of the eyeglass lens as the display screen. The light source portion and the scanning mirror are disposed in the frame portion. The scanning mirror projects the scanned laser beam onto the hologram mirror in an oblique direction. The first direction is set to a direction of changing a projection distance from the scanning mirror to the hologram mirror.

The drive controller drives the scanning mirror at a higher speed in the second direction than in the first direction. The display controller controls the light source portion to control focusing of the laser beam depending on a scanning position of the laser beam in the first direction. In this way, the scanned laser beam is projected onto the hologram mirror in the oblique direction, and the first direction is set to the direction of changing the projection distance from the scanning mirror to the hologram mirror. Accordingly, the projection distance from the scanning mirror to the hologram mirror changes in the first direction. However, since the display controller controls focusing of the laser beam depending on the scanning position of the laser beam in the first direction, it is possible to display a clear image over the entirety of the hologram mirror. Further, since the scanning speed is slower in the first direction than in the second direction, the above arrangement is advantageous in performing focus control at a low speed.

In the scanning type image display apparatus, preferably, the scanning mirror may be resonantly driven along two axes. In the above arrangement, since the scanning mirror is resonantly driven along two axes, the above arrangement is advantageous in properly scanning a laser beam with a less driving force.

In the scanning type image display apparatus, preferably, the scanning mirror may be a resonant mirror, and driving frequencies in the first direction and in the second direction may be respectively set near resonant frequencies of the scanning mirror in the first direction and in the second direction, the drive controller may output, to the scanning mirror, the drive signal configured such that the driving frequency is discretely set with an interval of a predetermined step size, and the drive controller may switch, in a case where the resonant frequency of the scanning mirror in one of the first direction and the second direction varies, the driving frequency to a driving frequency at a succeeding step, before the varied resonant frequency reaches the discretely set driving frequency at the succeeding step, and may switch, in response to the switching of the driving frequency, the driving frequency of the scanning mirror in the other of the first direction and the second direction while maintaining a predetermined relationship.

In the above arrangement, the scanning mirror is a resonant mirror, and driving frequencies in the first direction and in the second direction are respectively set near resonant frequencies of the scanning mirror in the first direction and in the second direction. The drive controller outputs, to the scanning mirror, the drive signal configured such that the driving frequency is discretely set with an interval of a predetermined step size. The drive controller switches, in a case where the resonant frequency of the scanning mirror in one of the first direction and the second direction varies, the driving frequency to a driving frequency at a succeeding step, before the varied resonant frequency reaches the discretely set driving frequency at the succeeding step, and switches, in response to the switching of the driving frequency, the driving frequency of the scanning mirror in the other of the first direction and the second direction while maintaining a predetermined relationship. Accordingly, the above arrangement is advantageous in suppressing a variation of the scanning amplitude, because a change in the amplitude gain is reduced, and a variation of a drive signal level is reduced, as compared with the case where the driving frequency is switched to the driving frequency at the succeeding step after the varied resonant frequency has reached the discretely set driving frequency at the succeeding step. Thus, the above arrangement is advantageous in preventing lowering of the quality of a display image resulting from a variation of the scanning amplitude.

In the scanning type image display apparatus, preferably, the drive controller may switch the driving frequency to the driving frequency at the succeeding step, in a case where the resonant frequency of the scanning mirror in the one of the first direction and the second direction is displaced by one-half of the step size with respect to the discretely set driving frequency.

In the above arrangement, the drive controller switches the driving frequency to the driving frequency at the succeeding step, in a case where the resonant frequency of the scanning mirror in the one of the first direction and the second direction is displaced by one-half of the step size with respect to the discretely set driving frequency. The above arrangement is more advantageous in suppressing a variation of the scanning amplitude, because a change in the amplitude gain is further reduced, and a variation of a drive signal level is further reduced. In the scanning type image display apparatus, preferably, the scanning mirror may output a feedback signal representing an oscillatory waveform of the scanning mirror, and the drive controller may detect an amplitude of the scanning mirror based on the feedback signal to be outputted from the scanning mirror, control a level of the drive signal so that the detected amplitude is held to a predetermined value, detect a phase difference with respect to the drive signal of the oscillatory waveform of the scanning mirror based on the feedback signal, and determine a switching timing of the driving frequency based on the detected phase difference.

In the above arrangement, the scanning mirror outputs a feedback signal representing an oscillatory waveform of the scanning mirror. The drive controller detects an amplitude of the scanning mirror based on the feedback signal to be outputted from the scanning mirror, and controls a level of the drive signal so that the detected amplitude is held to a predetermined value. The drive controller detects a phase difference with respect to the drive signal of the oscillatory waveform of the scanning mirror based on the feedback signal, and determines a switching timing of the driving frequency based on the detected phase difference. Thus, the above arrangement is advantageous in determining a displacement amount of a resonant frequency with respect to a driving frequency based on a detected phase difference, and in accurately switching the driving frequency.

A scanning type image display apparatus according to another aspect of the invention includes a light source portion which emits a laser beam; a scanning mirror which scans the laser beam two-dimensionally in a first direction and in a second direction intersecting the first direction; a display controller which generates display data for modulating an intensity of the laser beam using pixel data representing an image to be displayed on a display screen, and causes the light source portion to emit an intensity-modulated laser beam based on the display data; and a drive controller which outputs a drive signal to the scanning mirror to control the scanning mirror, wherein the scanning mirror is a resonant mirror, and driving frequencies in the first direction and in the second direction are respectively set near resonant frequencies of the scanning mirror in the first direction and in the second direction, the drive controller outputs, to the scanning mirror, the drive signal configured such that the driving frequency is discretely set with an interval of a predetermined step size, and the drive controller switches, in a case where the resonant frequency of the scanning mirror in one of the first direction and the second direction varies, the driving frequency to a driving frequency at a succeeding step, before the varied resonant frequency reaches the discretely set driving frequency at the succeeding step, and switches, in response to the switching of the driving frequency, the driving frequency of the scanning mirror in the other of the first direction and the second direction while maintaining a predetermined relationship.

In the above arrangement, a light source portion emits a laser beam. A scanning mirror scans the laser beam two-dimensionally in a first direction and in a second direction intersecting the first direction. A display controller generates display data for modulating an intensity of the laser beam using pixel data representing an image to be displayed on a display screen, and causes the light source portion to emit an intensity-modulated laser beam based on the display data A drive controller outputs a drive signal to the scanning mirror to control the scanning mirror. The scanning mirror is a resonant mirror, and driving frequencies in the first direction and in the second direction are respectively set near resonant frequencies of the scanning mirror in the first direction and in the second direction. The drive controller outputs, to the scanning mirror, the drive signal configured such that the driving frequency is discretely set with an interval of a predetermined step size. The drive controller switches, in a case where the resonant frequency of the scanning mirror in one of the first direction and the second direction varies, the driving frequency to a driving frequency at a succeeding step, before the varied resonant frequency reaches the discretely set driving frequency at the succeeding step, and switches, in response to the switching of the driving frequency, the driving frequency of the scanning mirror in the other of the first direction and the second direction while maintaining a predetermined relationship. Accordingly, the above arrangement is advantageous in suppressing a variation of the scanning amplitude, because a change in the amplitude gain is reduced, and a variation of a drive signal level is reduced, as compared with the case where the driving frequency is switched to the driving frequency at the succeeding step after the varied resonant frequency has reached the discretely set driving frequency at the succeeding step. Thus, the above arrangement is advantageous in preventing lowering of the quality of a display image resulting from a variation of the scanning amplitude.

INDUSTRIAL APPLICABILITY

The scanning type image display apparatus according to the invention is applicable to an image display apparatus, a display system, and the like including a mobile projector, an eyeglass type HMD and HUD.

The invention claimed is:

1. A scanning type image display apparatus, comprising:
a light source portion which emits a laser beam;
a frame buffer which temporarily stores, frame by frame, a plurality of pixel data inputted from outside and representing an image to be displayed on a display screen;
a scanning mirror which scans the laser beam two-dimensionally in a first direction and in a second direction intersecting the first direction to project the laser beam to the display screen;
a drive controller which outputs a drive signal to the scanning mirror to control the scanning mirror; and
a display controller which reads out the pixel data from the frame buffer, generates display data for modulating an intensity of the laser beam using the readout pixel data, and causes the light source portion to emit an intensity-modulated laser beam based on the display data, wherein
the frame buffer has a two-dimensional logical address space configured corresponding to the display screen, and stores the plurality of pixel data in address positions of the two-dimensional logical address space corresponding to respective positions on the display screen in an order in which the plurality of pixel data is inputted,
in the two-dimensional logical address space of the frame buffer, a direction corresponding to the order in which the pixel data is stored is defined as an address direction,
the drive controller drives the scanning mirror so that the laser beam is scanned in a direction nonparallel to a direction corresponding to the address direction on the display screen, and outputs, to the display controller, information relating to the drive signal to be outputted to the scanning mirror,
the display controller calculates a scanning position of the laser beam on the display screen by the scanning mirror based on the information relating to the drive signal inputted from the drive controller, reads out a plurality of pixel data including pixel data stored in an address position of the two-dimensional logical address space corresponding to the calculated scanning position on the display screen or a position near the scanning position by executing a burst access to the frame buffer in the address direction, and implements interpolation using the plurality of readout pixel data to generate the display data corresponding to the scanning position of the laser beam on the display screen,
the scanning mirror is a resonant mirror, and driving frequencies in the first direction and in the second direction are respectively set near resonant frequencies of the scanning mirror in the first direction and in the second direction,
the drive controller outputs, to the scanning mirror, the drive signal configured such that the driving frequency is discretely set with an interval of a predetermined step size, and
the drive controller switches, in a case where the resonant frequency of the scanning mirror in one of the first direction and the second direction varies, the driving frequency to a driving frequency at a succeeding step, before the varied resonant frequency reaches the discretely set driving frequency at the succeeding step, and switches, in response to the switching of the driving frequency, the driving frequency of the scanning mirror in the other of the first direction and the second direction while maintaining a predetermined relationship.

2. The scanning type image display apparatus according to claim 1, wherein
the display controller includes a buffer memory for temporarily storing the plurality of readout pixel data obtained by executing the burst access to the frame buffer, and
the display controller, after storing the plurality of readout pixel data obtained by executing the burst access to the frame buffer into the buffer memory, reads out a plurality of pixel data by re-executing the burst access to the frame buffer, and implements two-dimensional interpolation, using the plurality of readout pixel data obtained by re-executing the burst access and the plurality of pixel data stored in the buffer memory to generate the display data corresponding to the scanning position of the laser beam on the display screen.

3. The scanning type image display apparatus according to claim 2, wherein
address positions of the plurality of readout pixel data obtained by re-executing the burst access by the display controller are located on the opposite side of address positions of the plurality of pixel data stored in the buffer memory, in a direction orthogonal to the address direction, with respect to an address position in the two-dimensional logical address space corresponding to the scanning position of the laser beam on the display screen.

4. The scanning type image display apparatus according to claim 2, wherein
the display controller generates the display data by implementing one-dimensional interpolation using the plurality of readout pixel data obtained by executing the burst access, in a case where an address position in the two-dimensional logical address space corresponding to the scanning position of the laser beam on the display screen coincides with address positions of the plurality of readout pixel data obtained by executing the burst access, in a direction orthogonal to the address direction, and
the display controller generates the display data by implementing two-dimensional interpolation using the plurality of readout pixel data individually obtained by executing the burst access two times, in a case where an address position in the two-dimensional logical address space corresponding to the scanning position of the laser beam on the display screen does not coincide with address positions of the plurality of readout pixel data obtained by executing the burst access.

5. The scanning type image display apparatus according to claim 1, wherein
the plurality of pixel data is inputted to the frame buffer in an order of addresses by raster scan,
the scanning mirror scans the laser beam so that the first direction is aligned parallel to a direction on the display screen corresponding to the address direction, and that the second direction is aligned orthogonal to a direction on the display screen corresponding to the address direction, and
the drive controller drives the scanning mirror at a higher speed in the second direction than in the first direction.

6. The scanning type image display apparatus according to claim 1, further comprising:
an eyeglass including an eyeglass lens and a frame portion; and
a hologram mirror which is formed on a surface of the eyeglass lens as the display screen, wherein
the light source portion and the scanning mirror are disposed in the frame portion,
the scanning mirror projects the scanned laser beam onto the hologram mirror in an oblique direction,
the first direction is set to a direction of changing a projection distance from the scanning mirror to the hologram mirror,
the drive controller drives the scanning mirror at a higher speed in the second direction than in the first direction, and
the display controller controls the light source portion to control focusing of the laser beam depending on a scanning position of the laser beam on the hologram mirror in the first direction.

7. The scanning type image display apparatus according to claim 1, wherein
the scanning mirror is resonantly driven along two axes.

8. The scanning type image display apparatus according to claim 1, wherein
the scanning mirror outputs a feedback signal representing an oscillatory waveform of the scanning mirror,
the drive controller holds phases ph1 and ph2, the phases ph1 and ph2 being phases, with respect to the drive signal, of the oscillatory waveform of the scanning mirror corresponding to a displacement from the resonant frequency by one-half of the step size with respect to the discretely set driving frequency measured in advance, and
the drive controller detects a phase, with respect to the driving signal, of the oscillatory waveform of the scanning mirror based on the feedback signal, and switches the driving frequency to the driving frequency at the succeeding step, when the detected phase is equal to phase ph1 or phase ph2.

9. The scanning type image display apparatus according to claim 1, wherein
the scanning mirror outputs a feedback signal representing an oscillatory waveform of the scanning mirror, and
the drive controller (i) detects an amplitude of the scanning mirror based on the feedback signal to be outputted from the scanning mirror, (ii) controls a level of the drive signal so that the detected amplitude is held to a predetermined value, (iii) holds a predetermined phase, with respect to the drive signal, of the oscillatory waveform of the scanning mirror measured in advance, (iv) detects a phase, with respect to the drive signal, of the oscillatory waveform of the scanning mirror based on the feedback signal, and (v) switches the driving frequency to the driving frequency at the succeeding step, when the detected phase is equal to the predetermined phase.

* * * * *